(12) United States Patent
Morgenstern et al.

(10) Patent No.: US 6,189,656 B1
(45) Date of Patent: Feb. 20, 2001

(54) LUBRICANT SUPPLY SYSTEM

(75) Inventors: Garhard Morgenstern, Mettmann; Wolfgang Follert, Dortmund, both of (DE)

(73) Assignee: De Limon Fluhme GmbH (DE)

(*) Notice: Under 35 U.S.C. 154(b), the term of this patent shall be extended for 0 days.

(21) Appl. No.: 09/387,701

(22) Filed: Aug. 20, 1999

(30) Foreign Application Priority Data

Aug. 22, 1998 (EP) .................................................. 98115882

(51) Int. Cl.⁷ .................................................. F16N 27/00
(52) U.S. Cl. .................................. 184/7.4; 184/67; 184/108
(58) Field of Search .................................. 184/7.4, 6.12, 184/6, 109, 67, 108

(56) References Cited

U.S. PATENT DOCUMENTS

| | | | |
|---|---|---|---|
| 5,743,231 | * 4/1998 | Reindsa | 123/196 S |
| 5,782,315 | * 7/1998 | Reindsa | 184/6.3 |
| 5,921,350 | * 7/1999 | Tsai | 184/6.4 |
| 6,008,724 | * 12/1999 | Thompson | 340/438 |

FOREIGN PATENT DOCUMENTS

| | | |
|---|---|---|
| 195 44 692 A1 | 6/1997 | (DE) . |
| 0 374 958 | 6/1990 | (EP) . |
| 2 307 954 | 6/1997 | (GB) . |

* cited by examiner

*Primary Examiner*—David Fenstermacher
(74) *Attorney, Agent, or Firm*—Robert W. Becker & Associates

(57) ABSTRACT

A lubricant supply system for continuously and automatically lubricating machine parts has a housing and a lubricant reservoir mounted in the housing. A lubricant metering device is also mounted in the housing. A control device is provided for variably operating the lubricant metering device. The control device has a receiver receiving by wireless remote transmission operating and service data.

8 Claims, 1 Drawing Sheet

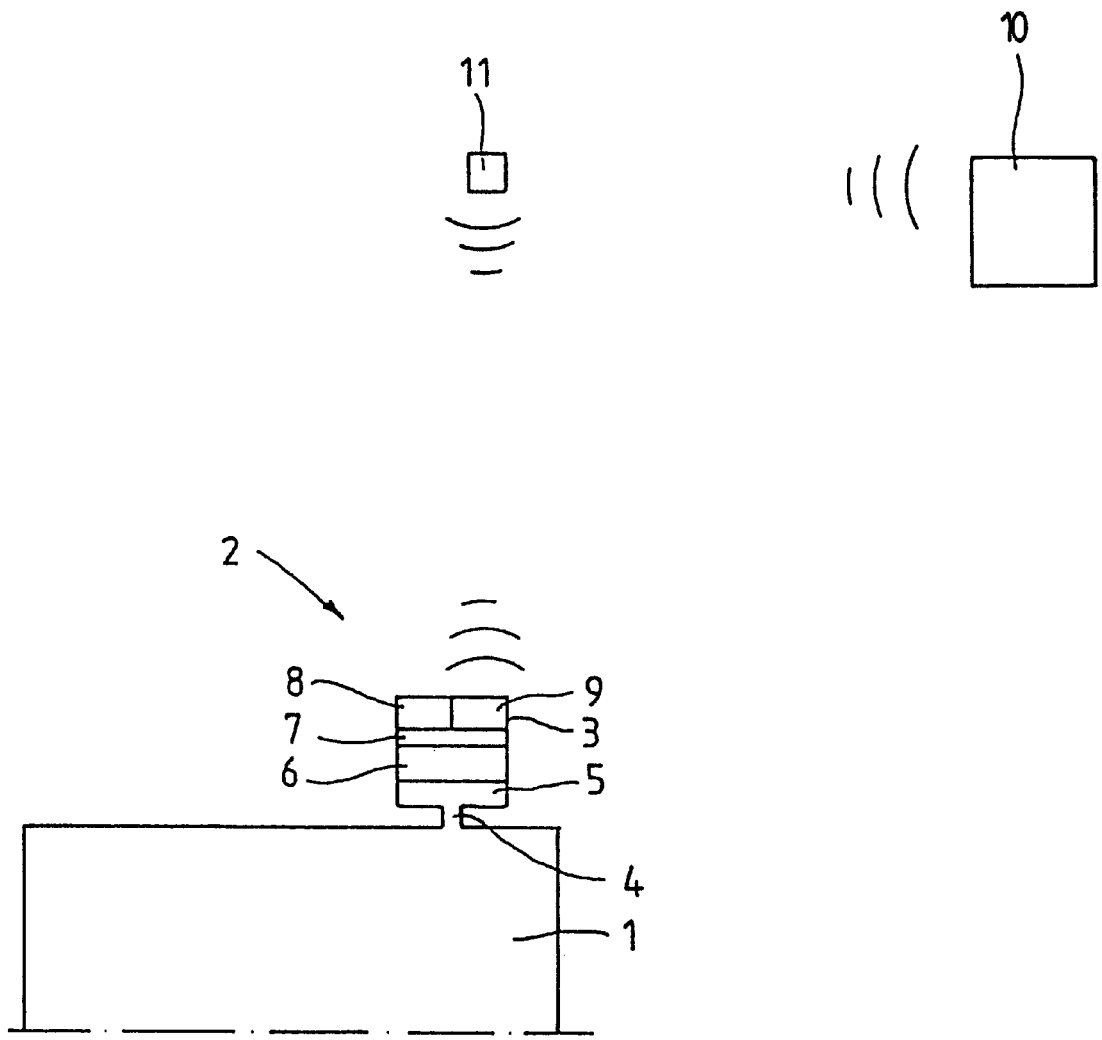

LUBRICANT SUPPLY SYSTEM

BACKGROUND OF THE INVENTION

The present invention relates to a lubricant supply system for continuously and automatically lubricating machine parts, especially bearings, comprising a housing connectable to the machine to be lubricated in which a lubricant reservoir and a device for a metered supply of the lubricant are arranged.

Lubricant supply systems of the aforementioned kind are known in a plurality of embodiments in the prior art. German patent application DE-A1 195 44 692 discloses, for example, a lubricant supply system with electromotor-driven supply of lubricant to a machine. This lubricant supply system is used to lubricate machine or device parts which are difficult to access or very remote or which are of a design requiring shutdown of the machine for lubrication. In order to provide for a continuous lubrication of machine or device parts, the lubricant supply systems of the aforementioned kind are connected to the machines to be lubricated. Lubricant is then supplied in a metered amount to the machine by a drive system that is based on a gas generator or an electromotor. Depending upon the adjusted amount to be supplied, the lubricant reservoir of a lubricant supply system can, for example, ensure continuous lubrication for up to one year. In addition to a fixed adjustment of a single metering program, lubricant supply systems are also known in practice which can be set to an alternative lubrication program by adjusting the gear ratio. A disadvantage of such known lubricant supply systems is that, for adjusting the system to a different lubricant supply program, the lubricant supply system must be demounted and manually adjusted. For this purpose, depending upon the type of machine, the machine must be shut down or the lubrication process must be interrupted for a certain amount of time.

It is therefore an object of the present invention to design a lubricant supply system of the aforementioned kind such that a flexible adjustment to different lubricant supply systems is possible without requiring a machine shutdown, etc.

SUMMARY OF THE INVENTION

According to the present invention, the system for supplying a lubricant is provided with a control device for a variable operation of the supply system and the control device comprises a receiver for receiving by wireless remote transmission operating and/or service data to be transmitted to the control device.

By employing a control device that can be accessed by wireless remote date transmission, it is possible for the first time to change the lubricant supply program of a lubricant supply system by a central control unit without requiring manual adjustment of the individual lubricant supply systems. With such a remote-controlled adjustment of the lubricant supply systems, machine downtimes or interruptions of the lubricant supply, as has been required in the past, are no longer needed so that the use of the inventive lubricant supply system provides for a considerable operational improvement and cost reduction.

According to a preferred embodiment, the control device comprises in addition a sender for a wireless remote transmission of data to a central control unit. With this additional provision of a sender, a direct communication between the central control unit and each individual lubricant supply system is possible. For example, in this manner data relating to the filling level of the lubricant reservoir and/or the drive of the metering device and/or the proper function of the pump or metering device can be monitored.

The wireless remote data transmission inventively is realized in an advantageous manner by infrared or high frequency (HF) signal transmission.

In order to ensure smooth operation of the lubricant supply system, it is inventively suggested that the sender of the control device periodically transmits the actual or current operational and service data to the central control unit so that by comparison of the actual value to the nominal or preset value in the central control unit a continuous monitoring of the operation of the lubricant supply system is realized.

According to a first embodiment of the invention, the device for metering the lubricant is embodied as a pump device or a piston device each operated by an electromotor. These electromotor-driven metering devices are usually supplied with energy by batteries which are to be introduced into the housing of the lubricant supply system. When employing such drives for the metering device, it is of course also possible to monitor the charge level of the batteries via the control device.

According to a second embodiment of the invention, the device for metering the lubricant is embodied as a pump device or a piston device driven by a gas generator. This gas generator which is known in the prior art, operates such that two chemical substances are brought into contact with one another and, during the course of the chemical reaction, produce a gas. This gas generation produces a pressure within a closed housing of the lubricant supply system which is used for operating the pump device or the piston device. Of course, it is also possible to employ a compressed gas for driving the pump or piston device.

BRIEF DESCRIPTION OF THE DRAWINGS

The object and advantages of the present invention will appear more clearly from the following specification in conjunction with the only drawing showing schematically the design of an inventive lubricant supply system.

DESCRIPTION OF PREFERRED EMBODIMENTS

The present invention will now be described in detail with the aid of a specific embodiment shown in the only drawing.

The representative arrangement shows a machine 1 with a lubricant supply system 2 connected to the machine 1. For connecting the lubricant supply system 2 to the machine 1, a threaded piece 4 connected to the housing 3 of the lubricant supply system 1 or a coupling member is connected to the machine 1. In the housing 3 of the lubricant supply system 2 a lubricant reservoir 5 and a lubricant metering device 6 for a metered supply of the lubricant are arranged. The lubricant reservoir 5 is comprised of exchangeable cartridges, so that after emptying of the lubricant reservoir 5, it is only necessary to insert a new cartridge into the housing 3 of the lubricant supply system 2.

The lubricant metering device 6 for dispensing the lubricant can be embodied as an electromotor-driven or gas generator-driven pump or piston unit. In order to allow for a variable operation of the metering device 6, i.e., to be able to change the amount to be dispensed and/or the frequency of the dispensing action of the lubricant, the metering device 6 is connected to a control device 7 via which the operation of the metering device (6) can be variably adjusted.

In the represented embodiment, the control device 7 is provided with a receiver 8 and a sender 9 via which data can be transmitted to the control device 7 by wireless remote transmission from and to a central control unit 10. In the shown embodiment, the data transmission from the central control unit 10 to the receiver 8 respectively, from the sender 9 to the central control unit 10 can also be realized by employing an intermediate transmitter 11.

When it is desired to change the amount of lubricant to be dispensed and/or the time interval for the dispensing action, infrared or high frequency (HF) signals are sent by the central control unit 10 which are sent directly, or indirectly via the intermediate transmitter 11, to the receiver 8 of the control device 7. The control device 7 controls thus the metering device 6 for dispensing the lubricant according to the newly transmitted data. The newly set data are then transmitted via the sender 9 back to the central control unit 10 in which subsequently an actual value/nominal value comparison takes place in order to determine whether the correct operating data have been set. In addition to this change of the operational data of the lubricant supply system 2, it is also possible to transmit, via the receiver and sender 8,9 of the control device 7, periodically the operational data of the lubricant supply system 2 to the central control unit 10 in order to provide a continuous monitoring action of the lubricant supply system 2.

In addition to monitoring the operational data, it is also possible to monitor by the control device 7 the filling level of the lubricant reservoir 5 and for an electromotor-driven metering device 6 to check the charge level of the batteries. Also, the transport or dispensing action of the lubricant itself can be monitored. Via the sender 9 the corresponding data can be transmitted to the central control unit 10 which then initiates in a timely fashion refilling of the lubricant reservoir 5 or an exchange of the batteries for the electromotor-driven metering device 6.

The specification incorporates by reference the disclosure of European priority document 98 11 5882.7 of Aug. 22, 1998.

The present invention is, of course, in no way restricted to the specific disclosure of the specification and drawings, but also encompasses any modifications within the scope of the appended claims.

What is claimed is:

1. A lubricant supply system for continuously and automatically lubricating machine parts, said system comprising:
    a housing (3);
    a lubricant reservoir (5) mounted in said housing (3);
    a lubricant metering device (6) mounted in said housing (3);
    a control device (7) connected to said lubricant metering device (6) and variably operating said lubricant metering device (6);
    said control device (7) having a receiver (8) receiving by wireless remote transmission operating and service data.

2. A system according to claim 1, further comprising a central control unit (10), wherein said control device (7) has a sender (9) sending data by wireless remote transmission to said central control unit (10).

3. A system according to claim 2, wherein said sender (9) is an infrared sender or a high frequency sender and wherein said receiver (8) is an infrared receiver or a high frequency receiver.

4. A system according to claim 2, wherein said sender (9) sends periodically current operating and service data to said central control unit (10).

5. A system according to claim 1, wherein said control device (7) monitors a filling level of said lubricant reservoir (5).

6. A system according to claim 1, wherein said lubricant metering device (6) is a pump device having an electromotor drive or a piston device having an electromotor drive.

7. A system according to claim 1, wherein said electromotor drive comprises batteries inserted into said housing (3) and wherein a charge level of said batteries is monitored by said control device (7).

8. A system according to claim 1, wherein said lubricant metering device (6) is a pump device having a gas generator drive or a piston device having a gas generator drive.

* * * * *